United States Patent
Tabata et al.

(10) Patent No.: US 6,962,962 B2
(45) Date of Patent: Nov. 8, 2005

(54) OPTICALLY ACTIVE POLYMER OF CHIRAL ALKOXY-SUBSTITUTED PHENYLACETYLENE

(75) Inventors: Masayoshi Tabata, Sapporo (JP); Yasuteru Mawatari, Sapporo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 91 days.

(21) Appl. No.: 10/431,366

(22) Filed: May 8, 2003

(65) Prior Publication Data

US 2004/0092683 A1 May 13, 2004

(30) Foreign Application Priority Data

Nov. 7, 2002 (JP) ........................................ 2002-323639

(51) Int. Cl.$^7$ ...................... C08F 138/02; C08F 238/02; C08F 38/02
(52) U.S. Cl. ..................... 526/285; 526/346; 526/307.4; 526/307.5; 526/332
(58) Field of Search .............................. 526/285, 307.4, 526/307.5, 332, 346

(56) References Cited

PUBLICATIONS

Mawatari et al., Macromolecules, 34, 3776–3782 (2001).*
Kobunshi, Kako *Polymer Processing*, vol. 50, no. 5 (2001), pp. 211–223.
Mawatari et al., Yasutru *Macromolecules*, vol. 34, no. 11, (2001), pp. 3776–3782.
D'Amato et al., Rosaria *Macromolecules*, vol. 31, (1998), pp. 8660–8665.
Mawateri et al., Yasuteru *Polymer Preprints, Japan* vol., 51, no. 2, (2002), p. 283.

* cited by examiner

*Primary Examiner*—Ling-Sui Choi
(74) *Attorney, Agent, or Firm*—Wenderoth, Lind & Ponack, L.L.P.

(57) ABSTRACT

The invention provides an optically active polymer which is a product obtained by polymerizing a chiral alkoxy-substituted phenylacetylene such as p-(2-methylbutoxy) phenylacetylene, of which the 2-methylbutoxy group has chirality, in an organic solvent such as triethylamine in the presence of a rhodium complex compound as a polymerization catalyst. The optically active polymer exhibits a much larger optical rotation than the monomeric compound per se and is colored in different colors of, e.g., yellow and black, depending on the organic solvent used for polymerization. The yellow polymer turns to black by exposure to the vapor of a specific organic solvent such as chloroform and returns to yellow by re-precipitation from a chloroform solution with addition of methyl alcohol as a precipitant.

9 Claims, 2 Drawing Sheets

US 6,962,962 B2

OPTICALLY ACTIVE POLYMER OF CHIRAL ALKOXY-SUBSTITUTED PHENYLACETYLENE

BACKGROUND OF THE INVENTION

The present invention relates to an optically active polymer of a chiral alkoxy-substituted phenylacetylene and a method for the preparation thereof. More particularly, the invention relates to an optically active polymer of an alkoxy-substituted phenylacetylene capable of exhibiting reversibly varied photoabsorption spectrum and/or photoemission spectrum as well as a method for the preparation thereof. Still more particularly, the optically active polymer has a unique steric structure of a spiral conjugated structure of a phenylacetylene compound substituted by an alkoxy group having chirality.

The inventors previously disclosed several polymers of substituted acetylene compounds, which are known to exhibit a structural change between a cis structure and a trans structure by way of the double bonds along the main chain of the polymer molecules. These conventional acetylene polymers, however, have problems relative to the stability in air due to their high susceptibility to oxidation by the oxygen in the atmospheric air and relative to their low controllability in the agglomeration behavior of the polymer chains. In this regard, the inventors have discovered that a polymer of an acetylene compound substituted by a specific group can be imparted with greatly increased stability against oxidation by virtue of its spiral structure which considerably inhibits conjugation along the direction of the main chain of the polyacetylene molecule.

A report is found in Kobunshi Kako (Polymer Processing), volume 50, No. 5, pages 221–223 (2001), in which a disclosure is given of a polymer of an acetylene monomer substituted by a p-nitrophenyl group or p-3-methylbutoxy group having a degree of polymerization in the range from 1.5 to $1440.0 \times 10^3$.

Further, a report is found in Macromolecules, volume 34, No. 11, pages 3776–3782 (2001) on a phenomenon that the above-described polymer of a substituted phenylacetylene exhibits a sift in the peak wavelength of the absorption spectrum from 430 nm to 460 nm as a result of the cis-trans transition caused by compression. It is also taught there that the above mentioned polyacetylene compound in the cis form is in an agglomerated form and the state of agglomeration is subject to changes by compression resulting in a shift of the peak wavelength of the absorption spectrum from 490 nm to 450 nm.

Relative to the disclosures in the above mentioned prior art documents, the inventors directed their attention to the effect of chirality of the substituent groups on the phenyl group of the phenylacetylene monomers and have continued extensive investigations along the line of this problem leading to establishment of the present invention based on their unique and unexpected discovery that, when the aforementioned polyacetylene compound is exposed to the vapor of a specific organic solvent, a novel polyacetylene compound is obtained which has a superspiral conjugation structure by the π electrons due to the double bonds.

SUMMARY OF THE INVENTION

Accordingly, the present invention has an object to provide a novel optically active polyacetylene compound having a pseudo-hexagonal structure, in the polyacetylene compounds of a cis-transoid structure having a spiral structure illustrated in FIG. 1 of the accompanying drawing, based on an optically active polyacetylene compound having an alkoxy substituent group of at least 4 carbon atoms including a secondary carbon atom or, namely, a so-called chiral alkoxy group. It is presumable that such a polyacetylene compound has a structure, referred to as the superspiral conjugation structure hereinafter, that the π electrons due to the double bonds not lying on one and the same plane are in conjugation. Another object of the present invention is to provide an efficient method for the preparation of such a substituted polyacetylene compound as well as the pseudo-hexagonal structure of the polymer and a method for accomplishing such a structure.

Thus, the present invention provides an optically active polyphenylacetylene compound substituted by chiral alkoxy groups as represented by the general formula

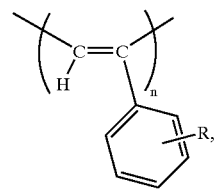

in which R is a chiral alkoxy group having at least 4 carbon atoms including a secondary carbon atom and the subscript n is an integer of 10 or larger.

The above-defined optically active polyphenylacetylene compound can be prepared by bringing an alkoxyphenylacetylene compound represented by the general formula

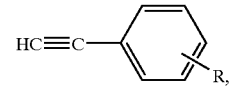

in which R has the same meaning as defined above, as dissolved in an organic solvent into contact with a rhodium complex compound to effect polymerization of the monomeric compound.

Further, the present invention provides an optically active polyacetylene compound substituted by chiral alkoxy groups of a superspiral conjugation stricture by the π electrons based on the double bonds in the direction of the spiral axis and having a pseudo-hexagonal structure. Such an optically active polyacetylene compound of the superspiral conjugation structure can be obtained by exposing the above described chiral alkoxy-substituted polyphenylacetylene compound to the vapor of a specific organic solvent.

DETAILED DESCRIPTION OF THE PREFERRED EMBODIMENTS

Figure 1:
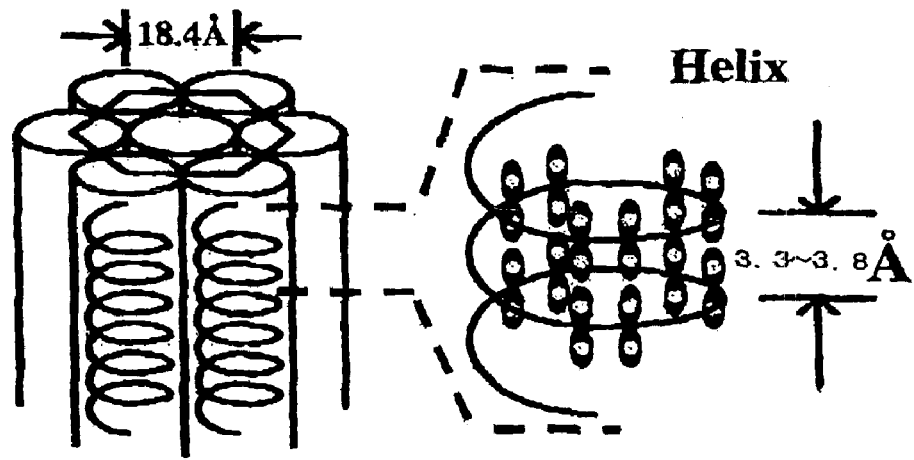
FIG. 1 is an illustration of the cis-transoid polyacetylene compound.
Figure 2A:
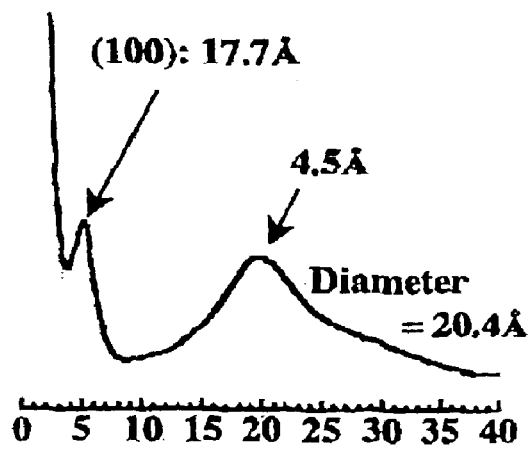
FIGS. 2A and 2B show X-ray diffraction patterns of the ps2MBPA prepared in Examples.
Figure 2B:
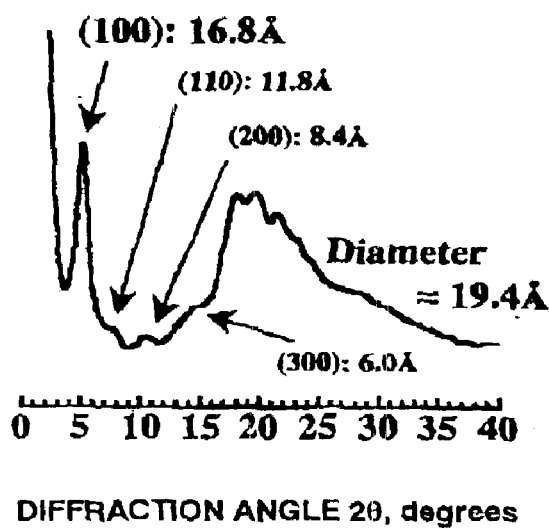

The method for the synthetic preparation of the chiral alkoxy-substituted phenylacetylene compound used as the monomer for the inventive optically active polyphenylacetylene compound is not particularly limitative. For example, the monomeric compound can be synthesized according to the method described in Macromolecules, volume 31, page 8660 (1998) by R. D'Amato, et al.

While the monomeric compound prepared by the aforementioned method can be polymerized when the monomeric compound is dissolved in an organic solvent to give a solution and brought therein into contact with a rhodium complex compound as a polymerization catalyst, the rhodium complex compounds suitable for the polymerization catalyst is not particularly limitative and various complex compounds can be used for the purpose including [Rh(norbornadiene)Cl]$_2$, [Rh(cyclooctadiene)Cl]$_2$, [Rh(bis-cyclooctene)Cl]$_2$ and the like, of which [Rh(norbornadiene)Cl]$_2$ is particularly preferable.

In conducting the polymerization reaction of the monomeric compound, a solution of the monomer is first prepared by dissolving the compound in an organic solvent which is selected from good solvents and relatively poor solvents to the polymeric compound to be formed by polymerization. The good solvents include triethylamine and chloroform and the relatively poor solvents include alcohols such as methyl and ethyl alcohols and water as well as mixtures thereof.

It is presumed that the Rh complex compound as the polymerization catalyst, e.g., Rh(norbornadiene)Cl]$_2$, is, when dissolved in triethylamine NEt$_3$, in an active state according to the following scheme:

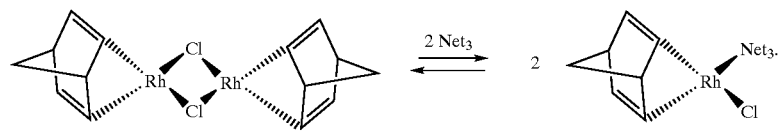

The optically active, chiral alkoxy-substituted polyphenylacetylene compound obtained by the polymerization reaction exhibits different colors depending on the solubility behavior of the solvent used in the polymerization. When the solvent is a relatively poor solvent, the polymer is obtained in the form of a yellow powder and, when the solvent is a good solvent, the polymer obtained by removal of the solvent exhibits a color of orange, red, reddish black or black. The polymerization reaction conducted in a triethylamine solution, for example, gives a black polymer.

The black polymer is considered to contain a large amount of the columnar pseude-hexagonal structure and the yellow polymer is considered to contain little or none of such a structure.

It is a discovery that the yellow polymer turns to black when exposed to the vapor of an organic solvent or, in particular, to the vapor of chloroform, triethylamine or toluene. The thus formed black polymer is considered to be a polymer of a novel class, referred to as a superspiral conjugation polymer, from the results of the X-ray diffractometric and reflection spectrophotometric studies indicating that the black polymer has a molecular conformation clearly different from that of the yellow polymer.

In contrast to the pseudo-hexagonal molecular structure of the black polymer, namely, the molecular structure of the yellow polymer is almost completely amorphous. The black polymer absorbs the visible to near infrared light. This is a result of the orderly conformation of the polymer molecule with a spiral pitch of 3.3 to 3.8 Å leading to the occurrence of the superspiral conjugation by the $\pi$ electrons due to the double bonds in the upper and lower turns of the spiral chain structure.

In the following, the present invention is described in more detail by way of Examples, which, however, never limit the scope of the invention in any way.

EXAMPLES 1 AND 2

A racemic mixture (Example 1) of p-(2-methylbutoxyphenyl)acetylene, referred to as p2 MBPA hereinafter, was prepared. Separately, p-(2-chiral-methylbutoxyphenyl)acetylene, referred to as ps2MBPA hereinafter (Example 2), was prepared by the synthetic method mentioned before.

One of these monomeric compounds was taken in one of the legs of an inversely U-shaped glass tube reactor having two inlet ports in an amount of $2.1 \times 10^{-3}$ mole together with 50 ml of dried triethylamine while a rhodium complex compound [Rh(norbornadiene)Cl]$_2$ was taken in the other leg of the glass reactor in an amount of $\frac{1}{100}$ to $\frac{1}{150}$ mole per mole of the monomeric compound together with 50 ml of dried triethylamine. By turning the glass tube reactor upside down, the mixtures contained in the respective legs of the reactor were blended together to form a uniform reaction mixture in which the polymerization reaction of the monomeric compound was started. The reaction was continued for 4 hours at 20° C. and then terminated by the addition of an excess volume of methyl alcohol. The black powder precipitated in the reaction mixture was collected by filtration, thoroughly washed with methyl alcohol and vacuum-dried for 24 hours. The thus obtained polymer product was subjected to the determination of the number-average molecular weight Mn by using chloroform as the solvent for determination to give the results shown in Table 1 which also shows the yield of the polymer product, ratio of the weight-average molecular weight Mw to the Mn and the color of the polymer.

EXAMPLES 3 TO 5

The experimental procedure in each of these Examples was substantially the same as in Examples 1 and 2 described above except that the polymerization solvent triethylamine was replaced with ethyl alcohol in Examples 3 and 4 for the polymerization of p2MBPA and ps2MBPA, respectively, and with toluene in Example 5 for the polymerization of ps2MBPA. The results are summarized in Table 1. The polymer obtained in Example 4 exhibited an optical rotation $[\alpha]=135.7°$ at 589 nm wavelength, which was much larger than the optical rotation $[\alpha]=12.1°$ of the ps2MBPA monomer.

TABLE 1

| Example | Monomer | Solvent | Yield, % | Mn/10$^4$ | Mw/Mn | Color |
|---------|---------|---------|----------|-----------|-------|--------|
| 1 | p2MBPA | TEA | 77 | 7.7 | 1.6 | Brown |
| 2 | ps2MBPA | TEA | 38 | 16.4 | 1.4 | Brown |
| 3 | p2MBPA | EtOH | 95 | 7.5 | 1.6 | Yellow |
| 4 | ps2MBPA | EtOH | 80 | 9.0 | 1.6 | Yellow |
| 5 | ps2MBPA | Toluene | 92 | 17.9 | 1.9 | Yellow |

Note:
TEA and EtOH mean triethylamine and ethyl alcohol, respectively.

EXAMPLE 6

Figure 3:
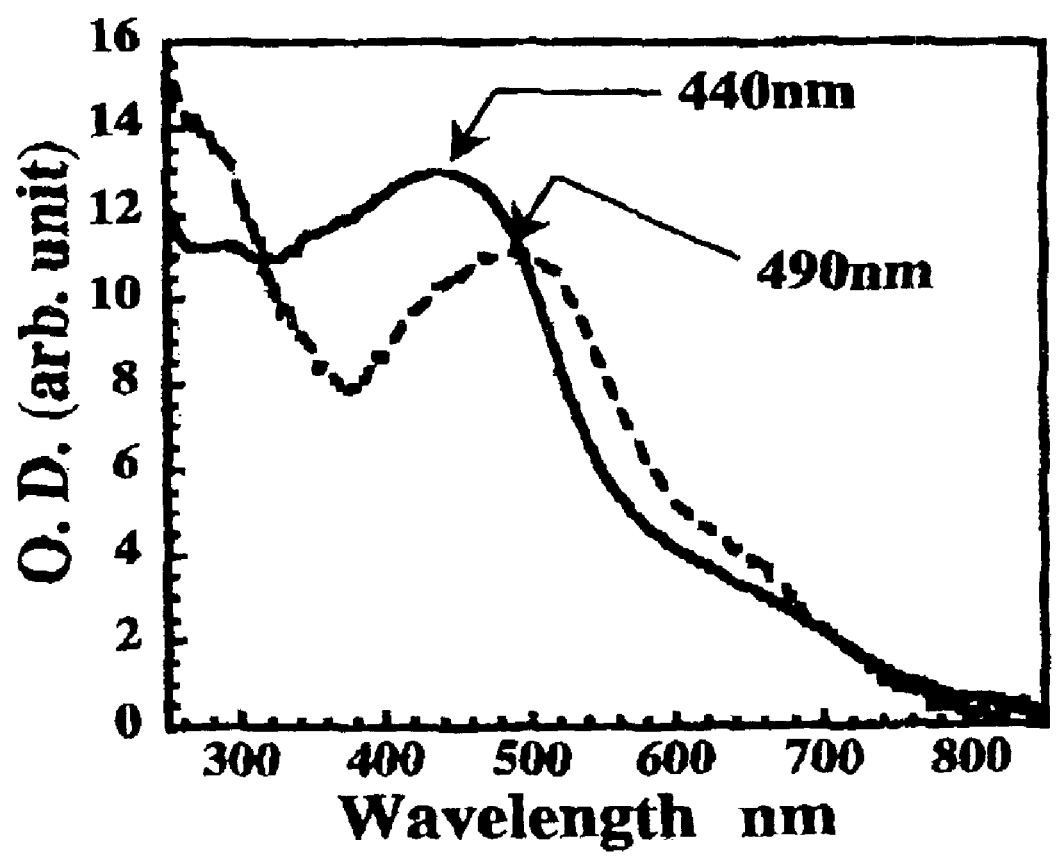
FIG. 3 shows the reflection spectra of the black polymer and yellow polymer.

One of the above-obtained yellow polymers was exposed for a short time to the vapor of chloroform to find that the color of the polymer turned to black. FIG. 3 shows the reflection spectra of the yellow and black polymers by the solid line curve and broken line curve, respectively. A shift was noted by this treatment in the absorption maximum wavelength from 440 nm of the yellow polymer to 490 nm of the black polymer. An increase in the absorption was found over a wide wavelength from the visible range at 400 nm to the near-infrared range of 1800 nm.

The black polymer formed by exposure of a yellow polymer to the vapor of chloroform or toluene could regain the yellow color in a re-precipitation treatment by dissolving the black polymer in chloroform or toluene followed by the addition of methyl alcohol as a precipitant. The reflection spectrum of the thus regenerated yellow polymer was just identical with the spectrum shown in FIG. 3.

The polyacetylene compound according to the present invention has a cis-transoid structure relative to the double bonds, which is crystalline with a pseudo-hexagonal structure formed by the self-agglomeration of a large number of the spiral-formed molecular chains as illustrated in FIG. 1 or, namely, a columnar structure as a kind of liquid-crystal textures.

Absorption of visible to near infrared light by the black polymer is a result of the orderly spiral structure with a pitch of 3.3 to 3.8 Å as is shown in FIG. 3 leading to occurrence of a superspiral structure by the π electrons due to the double bonds in the upper and lower turns of the spiral chain.

Since the polyacetylene compound of the present invention exhibits changes in color from yellow to black, from black to reddish black, red, green, orange and yellow, the polymer can be used as a polychromatic material. Furthermore, the polymer has a good electroconductivity and heat conductivity so that the polymer is useful as a material for supply or absorption of electrons or heat. In addition, the application field of the polymer could be expanded by utilizing the morphological changes from an amorphous structure to a columnar crystalline structure.

What is claimed is:

1. An optically active polyphenylacetylene substituted by chiral alkoxy groups as represented by the general formula

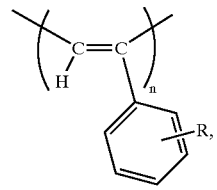

in which R is a chiral alkoxy group having at least 4 carbon atoms including a secondary carbon atom and the subscript n is an integer of 10 or larger.

2. The optically active polyphenylacetylene as claimed in claim 1 in which the chiral alkoxy group denoted by R is bonded to the phenyl group at the para position.

3. The optically active polyphenylacetylene as claimed in claim 1 which has a pseudo-hexagonal structure and has a superspiral conjugation structure by the π electrons due to double bonds.

4. A method for the preparation of the optically active polyphenylacetylene as defined in claim 1 which comprises the step of: bringing an alkoxyphenylacetylene represented by the general formula

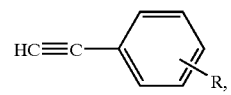

in which R is a chiral alkoxy group having at least 4 carbon atoms including a secondary carbon atom, as dissolved in an organic solvent into contact with a rhodium complex to effect polymerization thereof.

5. The method as claimed in claim 4 in which the rhodium complex is $[Rh(norbornadiene)Cl]_2$.

6. The method as claimed in claim 4 in which the organic solvent is an amine or an alcohol.

7. The method as claimed in claim 4 in which the organic solvent is triethylamine.

8. The method as claimed in claim 4 in which the organic solvent is chloroform.

9. The method as claimed in claim 4 in which the amount of the rhodium complex is in the range from $1/100$ to $1/150$ mole per mole of the alkoxyphenylacetylene.

* * * * *